June 9, 1942.                D. D. WELCH                2,286,043
                            HEDGE TRIMMER
                         Filed Dec. 15, 1938

Inventor
D. D. Welch
By
Attorneys

Patented June 9, 1942

2,286,043

UNITED STATES PATENT OFFICE 2,286,043

HEDGE TRIMMER

Daniel D. Welch, Milwaukee, Wis.

Application December 15, 1938, Serial No. 245,865

1 Claim. (Cl. 30—205)

My invention refers to hedge trimmers, and it has for its object to provide a simple, economical, and effective motor-driven portable hedge trimmer.

A specific object of my invention is to provide a hand-controlled hedge trimmer having a gang of rotary cutting discs housed in a shell provided with V-shaped guards adapted to feed material being cut into an exposed portion of the cutting wheels.

With the above and other objects in view, my invention consists in certain peculiarities of construction and arrangement of parts, as will be hereinafter fully set forth in connection with the accompanying drawing and subsequently claimed.

Figure 1:
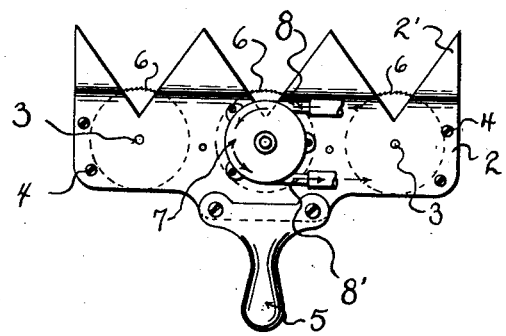
Figure 1 represents a plan view of a hedge trimmer embodying the features of my invention.

Referring more particularly to the drawing, the numeral 1 represents a narrow plate, and 2 a corresponding plate having V-shaped front extensions 2' which constitute a plurality of guards. The two plates are slightly spaced apart and are secured by bolts and spacing thimbles 4, the companion pair forming a housing. The rear portion of the housing has secured thereto a handle 5, which also forms a spacing element for the plates, whereby rigidity is added to the housing.

Figure 2:
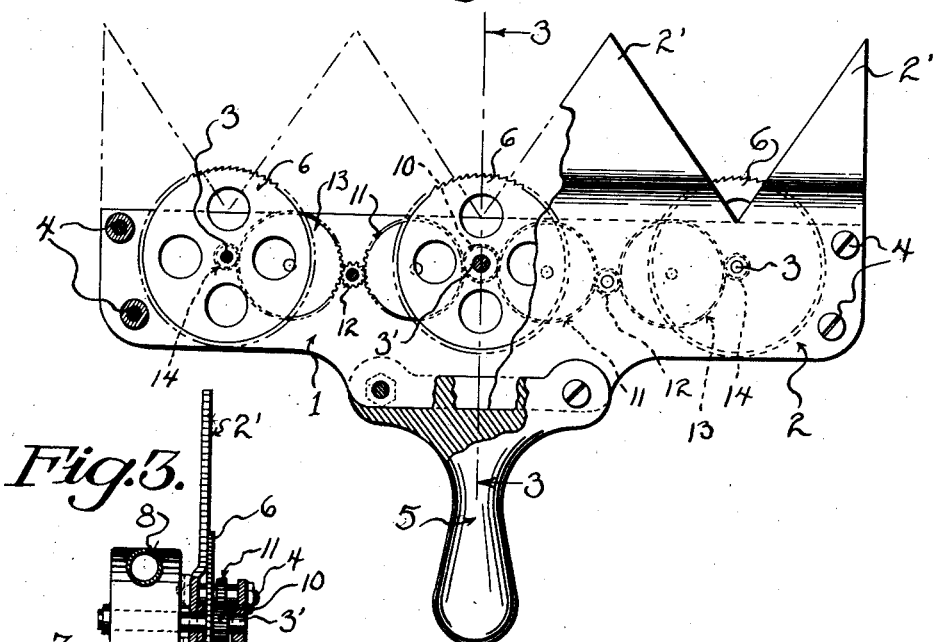
Figure 2 is an enlarged plan view, with parts broken away and in section to more clearly illustrate structural features.
Figure 3:
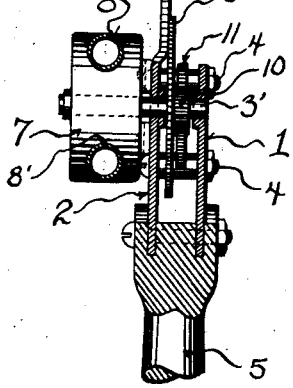
Figure 3 is a cross section of the same, the section being indicated by line 3—3 of Figure 2.

As noted in Figures 2 and 3 of the drawing, the flared shank of the handle is provided with a spaced pair of longitudinally disposed kerfs into which the edges of the plates 1 and 2 are tightly fitted, whereby said handle shank also serves as a spacer for said plates, it being understood that the assemblage is secured by bolts as shown.

Mounted in the housing plates are spindles 3—3 and 3'. These spindles serve as journals for circular toothed cutting discs 6, a small portion of which cutting disc is exposed at the base or throat formed by the guard fingers 2'. The central standard 3' extends through the top plate of the housing, and fitted thereover is a motor housing 7, the spindle within the housing being provided with veins (not shown). The housing has a fluid inlet 8 and an exhaust outlet 8', which nozzles are provides for the attachment of flexible hose. Thus, water, or any fluid element, can be fed to the motor and discharged therefrom, whereby said motor will impart rotation to the cutting wheels 6. The outer cutting wheels receive their drive from a pinion 10 mounted on the spindle 3', and this pinion in turn meshes with an idle gear wheel 11, the same imparting drive to a pinion 12, which transmits motion to another gear wheel 13, which last gear wheel meshes with pinions 14 carried by the outer cutting wheels 3.

Thus, it will be seen that a simple and durable hand tool is produced, which, due to its lightness, can effectually be handled, whereby hedges, or the like, can be readily trimmed in any required or desired shape, it being noted that the V-shaped guards will guide the hedge material directly into the revolving cutting knives.

While I have shown and described the center cutting wheel 6 as being driven by a water motor, obviously other types of motors may be employed.

Changes in details may be made without departing from the spirit or the scope of this invention, but what I claim as new is:

In a hedge trimming tool having upper and lower plates forming a gear housing, the front edge of one of said plates being provided with V-shaped cutting tools and spacing thimbles at the ends of said plates for securing the same together; the combination of a handle positioned at the back edges of said plates having a shank provided with pairs of kerfs for tightly engaging the plate edges, the said kerfs forming spacers for the plates in conjunction with the end spacer thimbles, the same being positioned at the back edge of the plate and centrally located with reference to the thimbles, whereby said kerfs and thimbles form skeleton braces at the ends and back of the plate for rigidly securing same with an uninterrupted open mouth at the front to permit freedom of action of the cutting gears, and a motor-driven series of cutting wheels mounted on said plates in gear connection.

DANIEL D. WELCH.